UNITED STATES PATENT OFFICE.

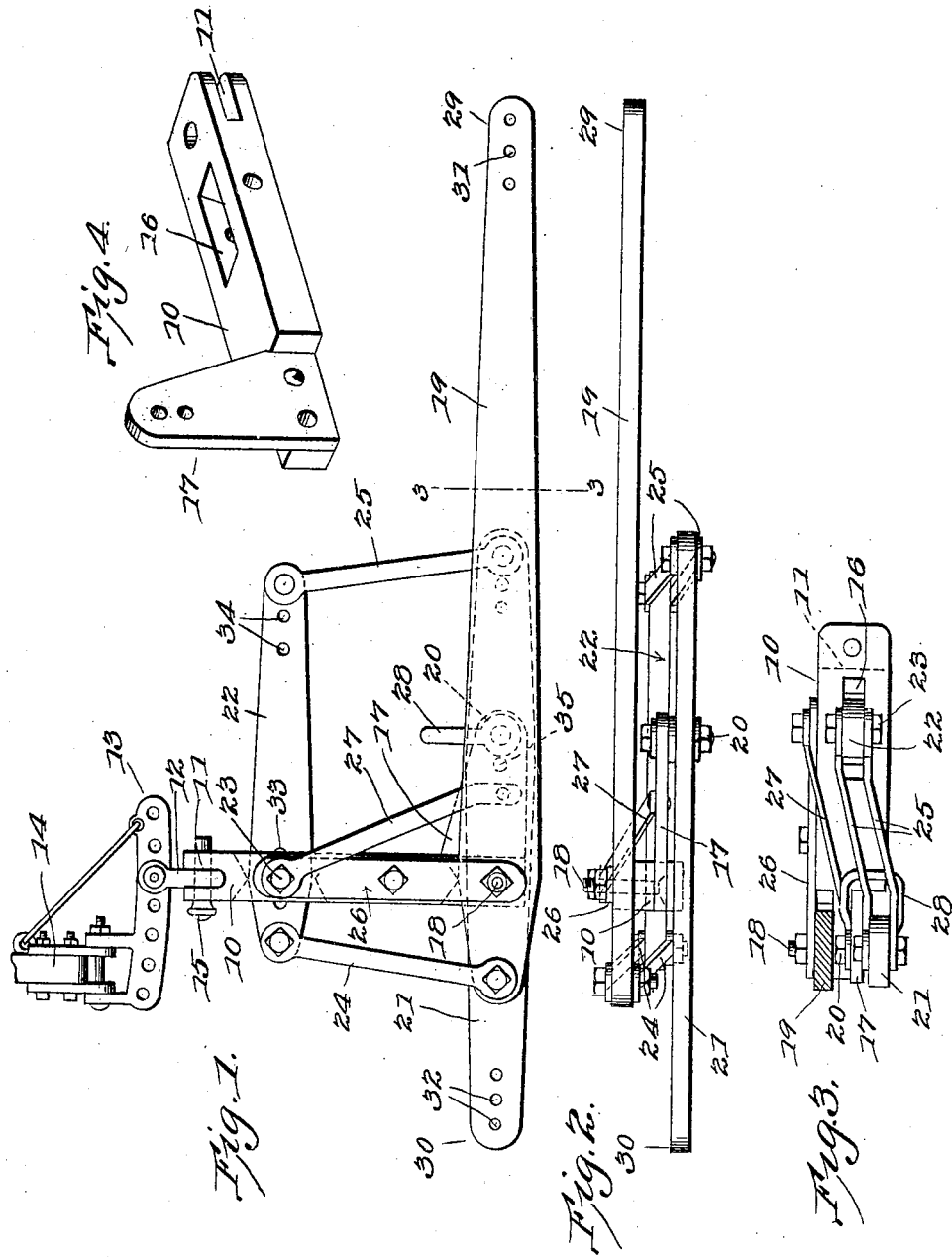

CHARLES H. MATLOCK, OF EMDEN, ILLINOIS.

FOUR-HORSE EQUALIZER.

No. 813,567.  Specification of Letters Patent.  Patented Feb. 27, 1906.

Application filed August 21, 1905. Serial No. 275,142.

*To all whom it may concern:*

Be it known that I, CHARLES H. MATLOCK, a citizen of the United States, residing at Emden, in the county of Logan and State of Illinois, have invented a new and useful Four-Horse Equalizer, of which the following is a specification.

This invention relates to four-horse equalizers for use more particularly upon gang-plows, breaking-plows, and like implements for equalizing the draft, and has for its object to improve the construction and increase the efficiency of devices of this character and provide a simply-constructed device whereby the horses are enabled to move laterally to a greater extent without interference.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation.

In the drawings, Figure 1 is a plan view, and Fig. 2 is a front elevation, of the improved device. Fig. 3 is a section on the line 3 3 of Fig. 1. Fig. 4 is a perspective view, on an enlarged scale, of the clevis portion of the device turned on its side.

The improved device comprises a clevis member for attachment at one end to the plow or other implement or structure to be moved, two draft-beams of unequal length and coupled near one end to the clevis, an equalizer-beam connected near one end to the clevis, a coupling element between the shorter end of the equalizer-beam and the shorter end of the longer draft-beam, and a coupling element between the longer end of the equalizer-beam and the shorter end of the shorter draft-beam.

The clevis portion of the device consists of a bar 10, having a slot 11 in one end for receiving a coupling-link 12 of the clevis portion 13 of a plow-beam or other implement (indicated at 14) and held in place by a transverse pin 15. The clevis member 10 is also provided with a transverse aperture 16 and with a laterally-extending bracket 17 at the forward end.

Pivoted at 18 to the top of the member 10 is a long draft-beam 19, and pivoted at 20 to the bottom of the bracket 17 is a short draft-beam 21, the longer arms of said beams extending, respectively, in opposite directions.

Extending through the aperture 16 in the member 10 and rearwardly of the draft-beams 19 21 is an equalizer-beam 22, pivoted near one end in the member 10 by a pin or bolt 23. The shorter end of the equalizer-beam 22 is coupled to the shorter end of the longer draft-beam 19 by spaced straps 24, and the longer end of the equalizer-beam is likewise coupled to the shorter end of the shorter draft-beam 21 by spaced straps 25.

A brace-strap 26 is attached to the member 10 and bears over the bolts 18 and 23 and serves as an additional support to the pivot-bolt 18 and sustaining it against the strains of the beam 19, and a brace-strap 27 is connected between the bolt 23 and the bracket to support the latter against the strains. The pivot-bolt 20 is further supported by a U-shaped clip 28.

The draft-beams 19 21 and equalizer-beam 22 are so proportioned and the several pivotal points so disposed that the doubletrees or other draft appliances connected to the free ends of the beams 19 21 will cause an equalization of the draft and eliminate the side draft, and in practice the best results are attained by constructing the longer draft-beam 19 about fifty and three-fourths inches long between the pivotal point of the coupling-straps 24 and the point 29 where the horses are attached, with the pivot-pin 18 located about six inches from the point where the straps 24 are attached.

The shorter draft-beam 21 should be about thirty-seven inches long between the point where the straps 25 are connected and the point at 30 where the horses are attached, with the pivot-pin 20 located about twenty inches from the end 30. The pivot-pin 20 is located about nine inches from the pivot-pin 18.

The equalizer-beam 22 should be about twenty inches long between its outermost pivot-points, with the pivot 23 located about four inches from the shorter end.

The draft-beams 19 and 21 and the equalizer-beam 22 are provided with spaced apertures, as at 31, 32, 33, and 34, and the bracket 17 is likewise provided with spaced apertures, as at 35, so that the leverage-points of the various members may be changed, if required, to adapt the device to differences in the weight and power between the draft-animals.

The device is very simple in construction, can be inexpensively manufactured, and may be employed in any required position, as both sides are substantially alike, thus enabling the device to be reversed for use upon a right or left hand plow or other implement, as may be required.

Having thus described the invention, what is claimed is—

1. In a draft-equalizer, a clevis member, two draft-beams of unequal length each pivoted near one of its ends to said clevis member, the longer arms of the beams extending, respectively, in opposite directions, an equalizer-beam pivoted near one of its ends to said clevis, a coupling member between the shorter arm of the equalizer-beam, and the shorter arm of the longer draft-beam, and a coupling member between the longer arm of the equalizer-beam and the shorter arm of the short draft-beam.

2. In a draft-equalizer, a clevis member having a laterally-extending bracket, a relatively long draft-beam pivoted near one end to said clevis, a relatively short draft-beam pivoted near one end to said bracket with the longer ends of said draft-beams extending in opposite directions, an equalizer-beam pivoted to said clevis, a coupling element between the shorter end of said equalizer-beam and the shorter end of said longer draft-beam, and a coupling element between the longer end of said equalizer-beam and the shorter end of said shorter draft-beam.

In testimony that I claim the foregoing as my own I have hereto affixed my signature in the presence of two witnesses.

CHAS. H. MATLOCK.

Witnesses:
PHILIP WARD,
JAMES T. McNISH.